April 23, 1935.  T. BRIEGEL  1,998,653
TUBE JOINTING MACHINE
Filed Jan. 13, 1933  2 Sheets-Sheet 1
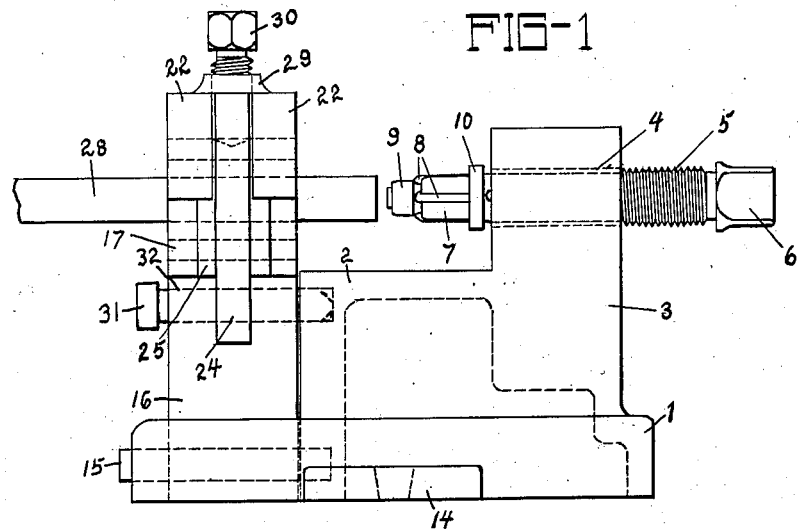
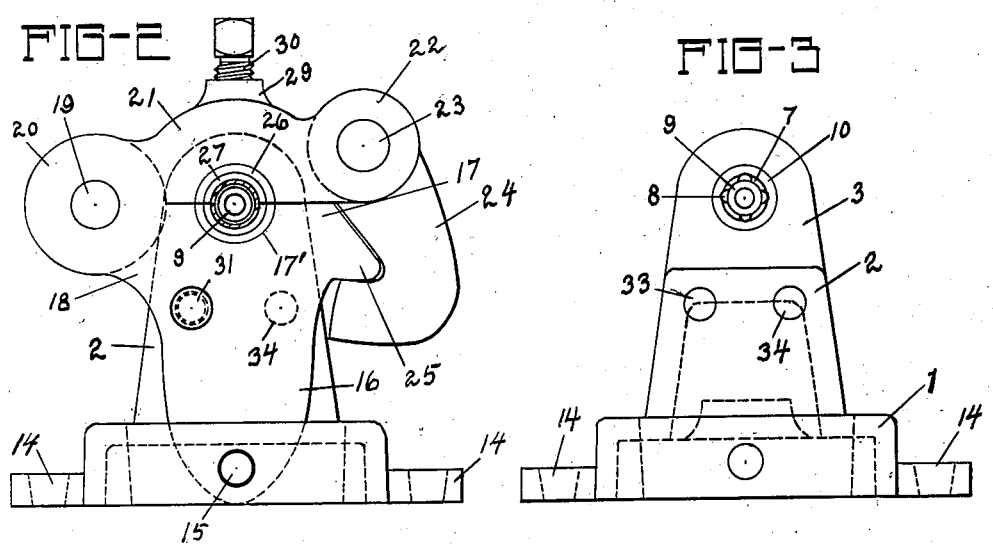
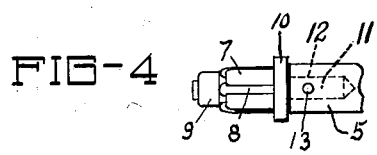
INVENTOR.
Theodore Briegel.
BY Walter N. Haskell,
his ATTORNEY.

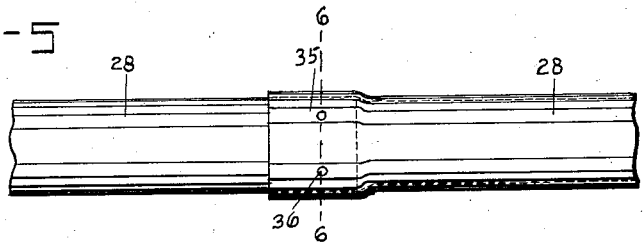
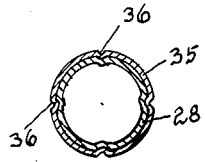
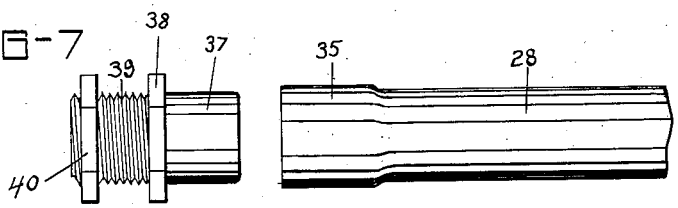

Patented Apr. 23, 1935

1,998,653

UNITED STATES PATENT OFFICE 1,998,653

TUBE JOINTING MACHINE

Theodore Briegel, Rock Island, Ill.

Application January 13, 1933, Serial No. 651,547

1 Claim. (Cl. 153—81)

My invention has reference to a tube jointing means, and it is more specially designed for use in uniting sections of steel tubing such as are made use of in forming conduits for carrying electrical wires and the like. The chief purpose thereof is to make it possible for workmen employed upon a job of electrical construction to cut the tubing in such lengths as may be called for and unite the sections on the job, with a consequent saving of time, and with greater convenience in working up the pieces of tubing into a conduit of desired length.

Another object of the invention is to produce a joint for the pieces of tubing without the use of any outside connections or fastenings, but entirely by means contained within the tubing itself. This results in a considerable saving in the cost of producing the conduit, as it is usual under the present method of uniting the sections to make use of couplings and connections which are separate from the tubing, and which require tapping and other operations in preparing the same for use. Considerable time is also required for assembling these parts and installing them on the tubing.

Another purpose of the invention is to provide means for employing the same in connection with couplings and other connections for attaching the end of a piece of tubing to an electrical boxing or similar structure.

Another purpose thereof is to provide a joint between the sections of tubing which will be impervious to moisture, and will prevent water from entering the conduit when embedded in plastic concrete or similar material.

The purpose of the invention is carried out by expanding one end of one tube section to a diameter to receive the end of the next adjacent section, uniting the ends of said sections, and compressing the expanded portion until the end of the adjacent section is tightly grasped thereby. At the same time the ends are fastened together by indentations formed in the outer telescoping part.

In said drawings:—

Fig. 1 shows the machine for expanding the end of a tube section and performing other work thereon.

Fig. 2 is an end view thereof from the left side.

Fig. 3 is a similar view with the vise mechanism removed.

Fig. 4 is a detail of the expansion head 7.

Fig. 5 shows fragmentary portions of two of the tube sections after being united.

Fig. 6 is a cross-section on the broken line 6—6 of Fig. 5.

Fig. 7 shows the fragmentary section of a tube and connection for use therewith in attaching the same to a metal box.

Referring first to the first three figures of the drawings, the reference number 1 indicates the base of a machine, mounted upon which is a bench 2, projected at one end into a column 3. In the upper part of said column, longitudinally of the machine, is a bore 4, threaded to receive a similarly tapped shaft 5, provided at its outer end with a tool-hold 6, for the attachment of a crank or other tool by means of which said shaft may be rotated. On the other end of said shaft is an expansion head 7, in the sides of which are rollers 8, held rotatably in a cap 9 at one end and in a collar 10 at the other end. The expansion tool is preferably connected with the shaft 5 so as to be detachable therefrom, as by means of a shank 11 extending from said tool into a recess 12 in the end of said shaft, and held therein by a pin 13. An expansion tool of one diameter can thereby be substituted for one of another diameter.

In that end of the base 1 farthest from the column 3 is fixed a shaft 15, upon which is rockingly mounted a vise mechanism for holding a section of tubing. Said mechanism consists of a support 16, having an opening in its lower part through which the shaft passes, and extending upwardly into a body portion 17, projected at one side into a bearing 18, in which is fixed a pivot 19, on the ends of which is supported a pair of ears 20 on the end of a crown-plate 21, supported on the body 17. The other end of said crown-plate is provided with a pair of ears 22, containing a pin 23 upon which is pivoted a hook 24 for engagement with a detent 25 on the body 17. The crown-plate 21 is thereby held from movement on the body portion 17.

Formed jointly in the crown-plate 21 and support 17 is a circular opening 17', in which is held a split sleeve 26, containing a similarly split bushing 27, adapted to receive a piece of tubing, as shown at 28. Above said crown-plate is a boss 29, said boss and plate being vertically bored and tapped to receive a set-screw 30, the lower end of which bears upon the upper plate of the sleeve 26. By tightening said screw a section of tubing can be rigidly clamped in the bushing 27. The support 17 is held normally in operative position, with the tube section in axial alignment with the expansion head 7 by means of a pin 31 passing through a perforation in the support 17 at 32, and entering a hole 33 in the face of the bench 2. For some purposes hereinafter pointed out the pin is removed from the hole 33, the vise structure tilted to the right, and the end of the pin replaced in an opening 34 in the bench, locking the support 17 and parts carried thereby in the adjusted position.

With the section of tubing positioned rigidly in the vise structure, as shown in Fig. 1, by rotating the screw 5 in a direction to feed the same toward the tubing the expansion head is caused to enter the end of the tubing and cause an enlargement thereof into a head 35, with an inner diameter slightly greater than that of the outer diameter of the main piece of tubing. This enables the end of one section to enter the head of the next adjacent section, and form a joint therewith, as shown in Fig. 5. The head 35 is then tightly compressed upon the end of the other section and simultaneously provided with indentations shown at 36, which fasten the ends securely from separation. In this operation other mechanical devices are made use of which are not shown in this application, nor involved therein. In this operation a force is applied first on opposite sides of the tubing and a pair of indentations formed oppositely therein, after which the force is applied in a similar manner at right angles with the parts first compressed, and another pair of indentations provided coincidently therewith. These indentations extend through into the inner tube end, as shown in Fig. 6.

In Fig. 7 is shown a connection for use with the head 35, consisting of a short tube section 37 provided with a collar 38 and projected into a threaded end 39 for insertion into an opening in the wall of a switch-box or similar device, wherein it may be held by means of a nut 40. The tube end 37 is inserted in the head 35 and secured therein in the same manner as above set forth for joining the tubes.

When the sections of tubing have been united in the manner hereinbefore set forth a continuous conduit of uniform diameter is produced, and one into and through which electrical wires and cables can be readily threaded. There is some frictional engagement of the ends of the tubing, but in addition thereto the indentations in the tubing hold said ends in rigid engagement, and resist a considerable amount of force tending to separate the tubes.

The pieces of tubing are furnished in lengths of approximately ten feet, and when a shorter piece is required to form part of a conduit the vise mechanism is tilted to one side as before explained and locked in such position. The length of tubing is then positioned therein, with the end to be cut extending along the side of the bench 2 and column 3, whereupon such end can be severed by use of a saw or other tool. The vise mechanism is then tipped back into place with the tube in position for the expansion operation.

When a section of tubing has been provided with the expanded head on one of its ends it is removed from the machine and united with another section of tubing which is already in position, the swaging and indenting operations being performed by suitable means "on the job" after the sections are joined.

In the construction work short pieces of tubing are occasionally cut from the sections, and in slack times these pieces can be worked up into couplings by the workmen, by expanding one or both ends thereof in the manner hereinbefore shown.

What I claim and desire to secure, is:

A portable machine for preparing a section of tubing for connection with another section of tubing of the same diameter, consisting of a base, a column mounted thereon, a tube expanding mechanism supported by said column, a vise apparatus rockingly mounted on said base, provided with tube holding parts, said vise apparatus being capable of being held in locked position with the tube holding parts in axial alignment with the expanding mechanism, or out of alignment therewith, and means for locking said apparatus normally with a piece of tubing in axial alignment with said expanding mechanism.

THEODORE BRIEGEL.